US011434171B1

(12) United States Patent
Guan et al.

(10) Patent No.: US 11,434,171 B1
(45) Date of Patent: Sep. 6, 2022

(54) LOW-TEMPERATURE-DEPOSITED SELF-BIASED MAGNETIC COMPOSITE FILMS CONTAINING DISCRETE HEXAFERRITE PLATELETS

(71) Applicant: HRL Laboratories, LLC, Malibu, CA (US)

(72) Inventors: Xin N. Guan, Monterey Park, CA (US); Shanying Cui, Calabasas, CA (US); Florian G. Herrault, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/109,237

(22) Filed: Dec. 2, 2020

Related U.S. Application Data

(63) Continuation-in-part of application No. 16/592,477, filed on Oct. 3, 2019.
(Continued)

(51) Int. Cl.
*C04B 35/26* (2006.01)
*C04B 35/622* (2006.01)
(Continued)

(52) U.S. Cl.
CPC .... *C04B 35/2633* (2013.01); *C04B 35/62218* (2013.01); *H01F 1/0027* (2013.01);
(Continued)

(58) Field of Classification Search
None
See application file for complete search history.

(56) References Cited

U.S. PATENT DOCUMENTS

| 4,540,500 A | * | 9/1985 | Torii | C04B 35/2625 252/62.62 |
| 6,413,339 B1 | * | 7/2002 | Natarajan | H01F 41/0253 156/89.12 |

(Continued)

FOREIGN PATENT DOCUMENTS

JP   2003048773 A   *   2/2003   ......... C04B 35/2633

OTHER PUBLICATIONS

Mosleh et al., "Effect of annealing temperature on structural and magnetic properties of BaFe12O19 hexaferrite nanoparticles", Ceramics International 40 (2014) 7279-7284.
(Continued)

*Primary Examiner* — Kevin M Bernatz
(74) *Attorney, Agent, or Firm* — O'Connor & Company; Ryan P. O'Connor

(57) ABSTRACT

Some variations provide a magnetically anisotropic structure comprising a magnetically anisotropic film on a substrate, wherein the magnetically anisotropic film contains a plurality of discrete magnetic hexaferrite particles, wherein the film is characterized by an average film thickness from 1 micron to 5 millimeters, and wherein the magnetically anisotropic film contains from 2 wt % to 75 wt % organic matter. Some variations provide a magnetically anisotropic structure comprising an out-of-plane magnetically anisotropic film on a substrate, wherein the magnetically anisotropic film contains a plurality of discrete magnetic hexaferrite particles, wherein the film is characterized by an average film thickness from 1 micron to 5 millimeters, and wherein the magnetically anisotropic film contains a concentration of hexaferrite particles of at least 40 vol %. The magnetically anisotropic structures are fabricated at low temperatures so that the magnetically anisotropic film may be monolithically integrated into an integrated-circuit fabrication process.

27 Claims, 10 Drawing Sheets

Related U.S. Application Data

(60) Provisional application No. 62/983,290, filed on Feb. 28, 2020, provisional application No. 62/804,291, filed on Feb. 12, 2019.

(51) Int. Cl.
  *H01F 1/117* (2006.01)
  *H01F 1/00* (2006.01)

(52) U.S. Cl.
  CPC ...... *H01F 1/117* (2013.01); *C04B 2235/3274* (2013.01); *C04B 2235/5292* (2013.01); *C04B 2235/5436* (2013.01); *C04B 2235/5445* (2013.01); *C04B 2235/767* (2013.01); *C04B 2235/96* (2013.01); *Y10T 428/32* (2015.01)

(56) References Cited

U.S. PATENT DOCUMENTS

| | | | | |
|---|---|---|---|---|
| 2007/0131894 | A1* | 6/2007 | Takada | H01F 1/348 252/62.63 |
| 2010/0099365 | A1* | 4/2010 | Aramaki | H01Q 1/243 455/73 |
| 2010/0173101 | A1 | 7/2010 | Harris et al. | |
| 2012/0085963 | A1* | 4/2012 | An | C01G 49/0018 252/62.63 |
| 2013/0115160 | A1* | 5/2013 | Hill | C04B 35/624 423/594.2 |
| 2014/0070130 | A1* | 3/2014 | Kang | H01F 1/113 264/610 |
| 2019/0318858 | A1* | 10/2019 | Chen | H05K 9/0086 |
| 2019/0390088 | A1* | 12/2019 | Ueda | C09J 7/38 |

OTHER PUBLICATIONS

Ferk et al., "Monolithic Magneto-Optical Nanocomposites of Barium Hexaferrite Platelets in PMMA", Scientific Reports 5:11395 | DOI: 10.1038/srep11395.

Lisjak et al., "The Alignment of Barium Ferrite Nanoparticles from Their Suspensions in Electric and Magnetic Fields", J. Phys. Chem. B 2013, 117, 1644-1650.

Pullar, "Hexagonal ferrites: A review of the synthesis, properties and applications of hexaferrite ceramics", Progress in Materials Science 57 (2012) 1191-1334.

Chen et al, "Microwave and magnetic properties of self-biased barium hexaferrite screen printed thick films", Journal of Applied Physics 99, 08M904 (2006).

Notice of Allowance, U.S. Appl. No. 16/203,788 dated Jul. 9, 2020, citing Rangappa et al., "Preparation of Ba-Hexaferrite Nanocrystals by an Organic Ligand-Assisted Supercritical Water Process", 2010, Crystal Growth & Design, 10, 11-15 (Year: 2010) that is pp. 20-24 of the Notice of Allowance.

* cited by examiner

LOW-TEMPERATURE-DEPOSITED SELF-BIASED MAGNETIC COMPOSITE FILMS CONTAINING DISCRETE HEXAFERRITE PLATELETS

PRIORITY DATA

This patent application is a non-provisional application claiming priority to U.S. Provisional Patent App. No. 62/983,290, filed on Feb. 28, 2020, which is hereby incorporated by reference herein. This patent application is also a continuation-in-part application of U.S. patent application Ser. No. 16/592,477, filed on Oct. 3, 2019, which in turn claims priority to U.S. Provisional Patent App. No. 62/804, 291, filed on Feb. 12, 2019, each of which is hereby incorporated by reference herein.

STATEMENT REGARDING FEDERALLY SPONSORED RESEARCH OR DEVELOPMENT

This invention was made with Government support under U.S. Department of Defense Contract No. W911NF-17-C-0023. The Government has certain rights in this invention.

FIELD OF THE INVENTION

The present invention generally relates to hexaferrite nanoparticles and magnetically anisotropic films assembled from the hexaferrite nanoparticles.

BACKGROUND OF THE INVENTION

Integrated microwave and millimeter-wave magnetic components are of particular interest for military applications in which ultra-compact, highly-integrated subsystems are needed (e.g., radars, transmitters, receivers, etc.). Such magnetic components are also desired for many other applications, such as magnetic sensors, actuators, transformers, inductors, etc. Magnetic devices are key components of many microelectronic chips and systems.

There are a group of ferrites with a hexagonal crystal structure, known as hexaferrites (hexagonal ferrites). Hexaferrites are important materials commercially and technologically. Hexagonal ferrites are the most common magnetic materials used today, with the M-type (this is a subset of hexaferrites including $BaFe_{12}O_{19}$ and $SrFe_{12}O_{19}$) barium hexaferrite alone accounting for 50% of the total magnetic materials manufactured globally, at over 300,000 ton/year.

The hexagonal ferrites are all ferrimagnetic materials, and their magnetic properties are intrinsically linked to their crystalline structures. In addition to their general magnetic properties and uses as magnetic materials, there has been an explosion of interest in hexaferrites in the last decade for more exotic applications—such as electronic components and electromagnetic absorbers, composite materials, nanocomposites, magnetoelectric/multiferroic applications, and orientation in ferrite fibers.

Self-biased hexaferrite materials are enabling for magnetic microwave components such as circulators. However, hexaferrite materials are currently made from sintered powder and packaged with conductors as surface-mount components. Integration with integrated circuits is done at the board level with die attach (e.g., silver epoxy and solder) and wire bonds or printed circuit board wiring. These configurations result in poor use of space on devices and order-of-magnitude larger electronic subsystems than would be possible if self-biased hexaferrites could be selectively deposited as thick areas on semiconductor wafers as part of an integrated circuit fabrication process flow. However, existing methods to create integrated films require high-temperature film annealing (above 500° C., such as about 900° C.) to create crystalline alignment and thus self-biasing features. These high-temperature treatments are not compatible with integrated-circuit fabrication flows.

Most approaches to forming ferrites (e.g., sol-gel, citrate ligand-assisted synthesis, or mix and bake) create a precursor solid with a wide size distribution, followed by a thermal treatment in a furnace to form the ferrite crystal structure. There is significant atomic movement as the precursor elements combine into one crystal structure. The nanoparticle shape grows in size and the particles become more polydisperse with additional heating and atomic movement. Additionally, the conventional furnace treatment results in loss of surface chemical groups (such as hydroxides or dangling bonds) which leads to the loss of nanoparticle dispersion. Hexaferrite processing is reviewed in Harris et al., "Recent advances in processing and applications of microwave ferrites" *Journal of Magnetism and Magnetic Materials,* 2009, 321, 2035.

Pullar, "Hexagonal ferrites: A review of the synthesis, properties and applications of hexaferrite ceramics", *Progress in Materials Science* 57 (2012) 1191-1334 describes methods such as precipitation, combustion, and sol-gel synthesis of ferrites. Pullar explains that the formation of hexagonal ferrites is a complicated series of chemical reactions at elevated temperatures (>700° C.).

Wu et al., "Synthesis and assembly of barium-doped iron oxide nanoparticles and nanomagnets", *Nanoscale* 7 (2015) 16165-16169 shows the synthesis of round particles that lose shape upon high-temperature furnace treatment-induced crystallization and form a film of agglomerated, not discrete nanoparticles.

U. S. Patent App. Pub. No. 20100173101 A1 (Harris et al.) describes forming a wet paste of hexaferrites with binder material to create self-biased barium hexaferrite films of perpendicular magnetic anisotropy. A film-sintering temperature between 850° C. and 1300° C. is required to form the anisotropic film. The hexaferrite composite requires high temperature to burn out the organic components and sinter the material to obtain desired magnetic properties. Moreover, hot pressing is also required to improve film density due to the porous magnetic film obtained from the burn-out process.

Chao et al., "Millimeter wave hexagonal nano-ferrite circulator on silicon CMOS substrate", 2014 *IEEE MTT-S International Microwave Symposium* (IMS2014), describe a photoresist/$BaFe_{12}O_{19}$ nanoparticle composite for on-chip circulators. No patternability is demonstrated, and it is well-known that fill factor must remain low (<30%) to retain photodefinable capabilities. Resist/nanoparticle composites are also very sensitive to temperature.

Ferk et al., "Monolithic Magneto-Optical Nanocomposites of Barium Hexaferrite Platelets in PMMA", *Scientific Reports,* 2015, 5, 11395 describe highly magnetically anisotropic hexaferrite platelets. However, only up to 0.27% weight hexaferrite platelets are included in the disclosed composites.

Lisjak and Ovtar, "The Alignment of Barium Ferrite Nanoparticles from Their Suspensions in Electric and Magnetic Fields", *Journal of Physical Chemistry B,* 2013, 117, 1644 describe drying barium hexaferrite nanoparticles in both a magnetic and electric field. Magnetic anisotropy is not shown until there is an annealing step at 1150° C. for 5 hours.

Makled et al., "Magnetic and mechanical characterization of natural rubber coprecipitated barium ferrite composites at high loading", *Plastics, Rubber and Composites*, 2009, Vol. 38, No. 7, 297 describe the mechanical properties, swelling, and magnetic properties of a rubber-ferrite composite as a function of ferrite loading. The hysteresis loop of rubber-ferrite composite shows no alignment. In addition, the highest ferrite loading in this paper is 220 phr ferrite, which is roughly 68% by weight.

In view of the art, there is a desire for magnetically anisotropic structures that exhibit high ratios of remanent to saturation magnetization. It is desired for the magnetically anisotropic structures to be fabricated at a low temperature (following film formation), such as 250° C. or less, so that the magnetically anisotropic film may be monolithically integrated into an integrated-circuit fabrication process.

SUMMARY OF THE INVENTION

The present invention addresses the aforementioned needs in the art, as will now be summarized and then further described in detail below.

Some variations provide a magnetically anisotropic structure comprising a magnetically anisotropic film disposed directly or indirectly on a substrate, wherein the magnetically anisotropic film contains a plurality of discrete magnetic hexaferrite particles, wherein the magnetically anisotropic film is characterized by an average film thickness from about 1 micron to about 5 millimeters, and wherein the magnetically anisotropic film contains from 2 wt % to 75 wt % organic matter.

Some variations provide a magnetically anisotropic structure comprising an out-of-plane magnetically anisotropic film deposited directly or indirectly on a substrate, wherein the magnetically anisotropic film contains a plurality of discrete magnetic hexaferrite particles (e.g., nanoparticles and/or microparticles), wherein the magnetically anisotropic film is characterized by an average film thickness from about 1 micron to about 5 millimeters, and wherein the magnetically anisotropic film contains a concentration of the hexaferrite particles of at least 40 vol %.

In some embodiments, the average film thickness is about 10 microns to about 500 microns.

In some embodiments, the discrete magnetic hexaferrite particles are aligned with a full width at half maximum angular distribution of the hexaferrite particle c-axis direction of about ±20° or less.

In some embodiments, the discrete magnetic hexaferrite particles have a packing density of at least 40% within the magnetically anisotropic film.

In some embodiments, the discrete magnetic hexaferrite particles have a maximum dimension from about 500 nanometers to about 5 microns. In certain embodiments, the discrete magnetic hexaferrite particles are hexagonal platelets with an average diagonal dimension from about 500 nanometers to about 5 microns, and an average thickness from about 5 nanometers to about 100 nanometers.

The discrete magnetic hexaferrite particles may contain barium hexaferrite ($BaFe_{12}O_{19}$), strontium hexaferrite ($SrFe_{12}O_{19}$), or a combination thereof.

In some embodiments, the discrete magnetic hexaferrite particles exhibit an average saturation magnetization from about 25 emu/g to about 65 emu/g, measured at 25° C.

In some embodiments, the discrete magnetic hexaferrite particles exhibit an average magnetic coercivity from about 600 Oe to about 5000 Oe, measured at 25° C.

In some embodiments, the magnetically anisotropic film is characterized by a saturation magnetization that is greater than 50 emu/g.

In some embodiments, the magnetically anisotropic film is characterized by a remanence-to-saturation magnetization ratio that is at least 0.7.

The substrate may be fabricated from a substrate material selected from the group consisting of glass, silica, fused silica, silicon, silicon carbide, silicon nitride, gallium nitride, gallium arsenide, gold, poly(benzocyclobutene), poly(p-xylene), and combinations thereof, for example. In some embodiments, the substrate is a low-adhesion release film, such as a silane-treated and/or siloxane-treated film.

In some embodiments, the magnetically anisotropic structure is an element of a microelectronics component selected from the group consisting of an integrated-circuit chip, a circulator, an isolator, a non-reciprocal component, and a biasing magnet, for example.

Other variations of the invention provide a magnetically anisotropic structure produced by a process comprising:

(a) synthesizing or obtaining magnetic hexaferrite particles;

(b) thermally treating the magnetic hexaferrite particles at a treatment temperature of at least 800° C.;

(c) if the magnetic hexaferrite particles are agglomerated, mechanically treating the magnetic hexaferrite particles to form discrete particles;

(d) combining the magnetic hexaferrite particles with a solvent and an organic binder, to generate a dispersion; and (e) in the presence of a magnetic field, depositing the magnetic hexaferrite particles onto a substrate, to generate a magnetically anisotropic film of aligned, discrete magnetic hexaferrite particles disposed on the substrate, wherein the maximum processing temperature during step (c), step (d), and step (e) is 500° C. or less.

Other variations of the invention provide a method of making a magnetically anisotropic structure, the method comprising:

(a) synthesizing or obtaining magnetic hexaferrite particles;

(b) thermally treating the magnetic hexaferrite particles at a treatment temperature of at least 800° C.;

(c) if the magnetic hexaferrite particles are agglomerated, mechanically treating the magnetic hexaferrite particles to form discrete particles;

(d) combining the magnetic hexaferrite particles with a solvent and an organic binder, to generate a dispersion; and (e) in the presence of a magnetic field, depositing the magnetic hexaferrite particles onto a substrate, to generate a magnetically anisotropic film of aligned, discrete magnetic hexaferrite particles disposed on the substrate, wherein the maximum processing temperature during step (c), step (d), and step (e) is 500° C. or less.

DETAILED DESCRIPTION OF EMBODIMENTS OF THE INVENTION

Figure 1:
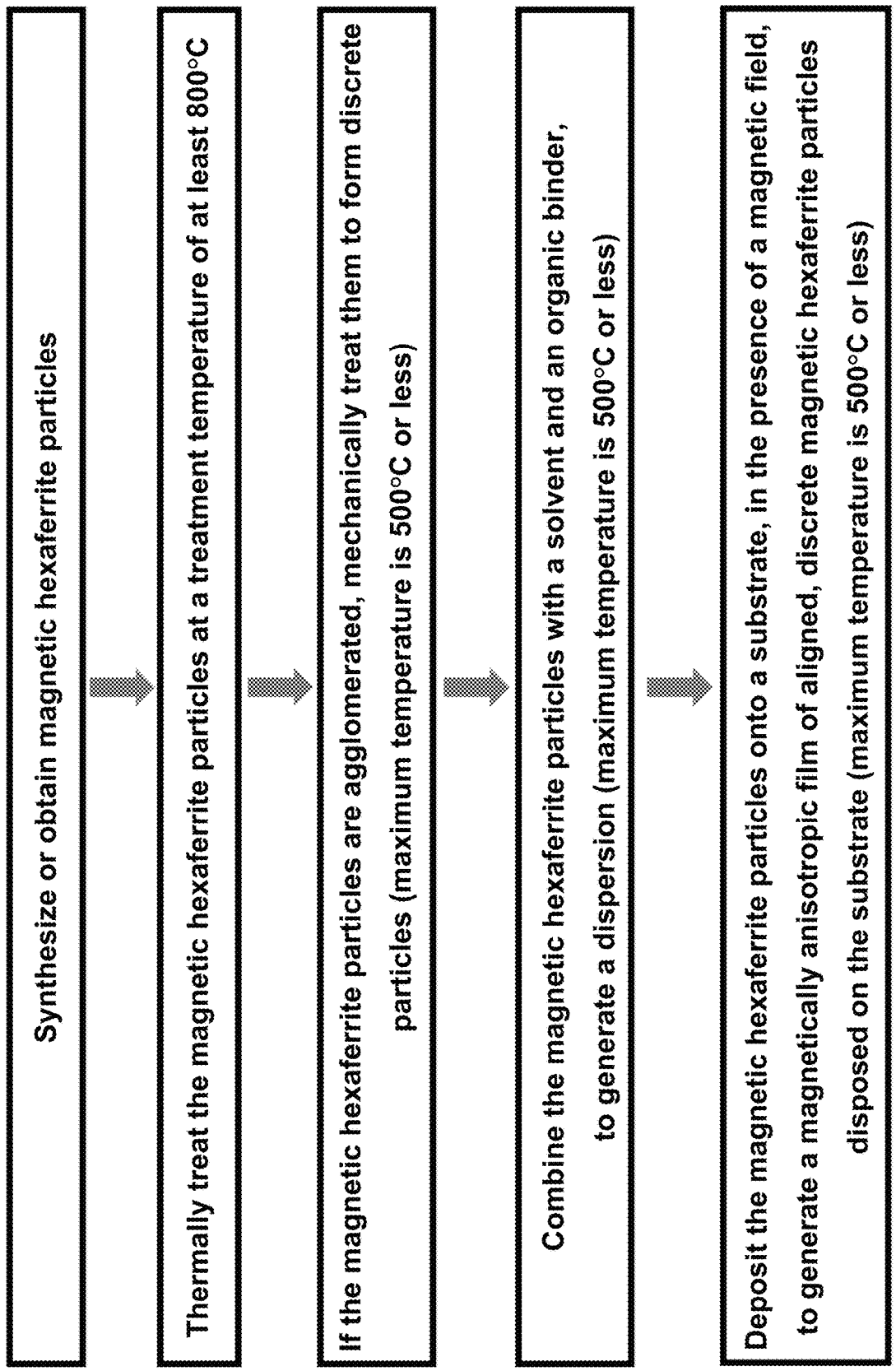
FIG. 1 is a flowchart of an exemplary method to form a magnetically anisotropic structure incorporating a hexaferrite film, in some variations.

The films, compositions, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique. Unless otherwise stated in this disclosure, magnetic properties are as measured at 25° C. and 1 bar.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide a film on a substrate, wherein the film contains hexaferrite particles and a binder, and wherein the film has not undergone high-temperature sintering or hot pressing. The hexaferrite particles themselves are preferably first thermally annealed to improve magnetic properties, such as magnetic anisotropy. The hexaferrite particles are isolated from each other in a dispersion that includes a low-viscosity binder resin and a solvent, allowing a high loading of hexaferrite particles. An assembly process yields a thin film of discrete and aligned hexaferrite particles (e.g., plates) on a substrate. The alignment and curing results in a magnetic material with high remanent magnetization. The magnetic material can be monolithically integrated into integrated circuits and electronic devices, since the film does not experience a high-temperature burn-out that would damage electrical components of a chip.

As disclosed herein, crystalline hexaferrite nanoparticles and/or microparticles that exhibit high-quality magnetic properties are synthesized or provided. The hexaferrite nanoparticles and/or microparticles are then annealed to improve magnetic properties (e.g., saturation magnetization and/or magnetic coercivity). Exemplary annealing conditions are a temperature of 1100° C. in air for 2 hours, prior to blending with the binder. The annealed hexaferrite nanoparticles and/or microparticles are mechanically treated to form individual hexaferrite particles (e.g., platelets). Finally, the individual hexaferrite particles are suspended in a binder-solvent mixture, aligned, and cured (with solvent evaporation) on a substrate under an applied magnetic field, preferably perpendicularly through the substrate, at low temperature (e.g., room temperature). The aligned films may exhibit a high saturation magnetization and/or a high remanence-to-saturation magnetization ratio. Other features, in various embodiments, include out-of-plane magnetic anisotropy and/or a high packing density of hexaferrite particles.

Some variations provide a magnetically anisotropic structure comprising a magnetically anisotropic film disposed directly or indirectly on a substrate, wherein the magnetically anisotropic film contains a plurality of discrete magnetic hexaferrite particles, wherein the magnetically anisotropic film is characterized by an average film thickness from about 1 micron to about 5 millimeters, and wherein the magnetically anisotropic film contains from 2 wt % to 75 wt % organic matter.

Some variations provide a magnetically anisotropic structure comprising an out-of-plane magnetically anisotropic film deposited directly or indirectly on a substrate, wherein the magnetically anisotropic film contains a plurality of discrete magnetic hexaferrite nanoparticles and/or microparticles, wherein the magnetically anisotropic film is characterized by an average film thickness from about 1 micron to about 5 millimeters, and wherein the magnetically anisotropic film contains a concentration of the hexaferrite nanoparticles and/or microparticles of at least 40 vol %.

In some embodiments, the average film thickness is about 10 microns to about 500 microns.

In some embodiments, the discrete magnetic hexaferrite particles are aligned with a full width at half maximum angular distribution of the hexaferrite particle c-axis direction of about ±20° or less.

In some embodiments, the discrete magnetic hexaferrite particles have a packing density of at least 40% within the magnetically anisotropic film.

In some embodiments, the discrete magnetic hexaferrite particles have a maximum dimension from about 500 nanometers to about 5 microns. In certain embodiments, the discrete magnetic hexaferrite particles are hexagonal platelets with an average diagonal dimension from about 500 nanometers to about 5 microns, and an average thickness from about 5 nanometers to about 100 nanometers.

The discrete magnetic hexaferrite particles may contain barium hexaferrite ($BaFe_{12}O_{19}$), strontium hexaferrite ($SrFe_{12}O_{19}$), or a combination thereof.

In some embodiments, the discrete magnetic hexaferrite particles exhibit an average saturation magnetization from about 25 emu/g to about 65 emu/g, measured at 25° C.

In some embodiments, the discrete magnetic hexaferrite particles exhibit an average magnetic coercivity from about 600 Oe to about 5000 Oe, measured at 25° C.

In some embodiments, the magnetically anisotropic film is characterized by a saturation magnetization that is greater than 50 emu/g.

In some embodiments, the magnetically anisotropic film is characterized by a remanence-to-saturation magnetization ratio that is at least 0.7.

The substrate may be fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof, for example. In some embodiments, the substrate is a low-adhesion release film, such as a silane-treated and/or siloxane-treated film.

In some embodiments, the substrate is a patterned substrate, and/or the magnetically anisotropic film is a patterned magnetically anisotropic film. A patterned magnetically anisotropic film may be an element of a microelectronics component selected from the group consisting of a circulator, an isolator, a non-reciprocal component, and a biasing magnet, for example.

The magnetically anisotropic structure may be disposed on or within an integrated-circuit chip.

Some variations provide a magnetically anisotropic structure comprising a magnetically anisotropic film disposed directly or indirectly on a substrate, wherein the magnetically anisotropic film contains a plurality of discrete magnetic hexaferrite particles, wherein the magnetically anisotropic film is characterized by an average film thickness from about 1 micron to about 5 millimeters, and wherein the magnetically anisotropic film contains at least 2 wt % organic matter, such as at least 25 wt % organic matter. For purposes of this disclosure, an "organic" material means a material containing at least C, H, and O.

The magnetically anisotropic film contains at least 0.5 wt % of a plurality of discrete magnetic particles, such as at least 1 wt %, 5 wt %, 10 wt %, 20 wt %, 30 wt %, 40 wt %, 50 wt %, 60 wt %, 70 wt %, 80 wt %, 90 wt %, 95 wt %, or 99 wt % of a plurality of discrete magnetic particles. These concentrations are based on the total weight of the magnetically anisotropic film. In these or other embodiments, the magnetically anisotropic film contains at least 1 vol %, 5 vol %, 10 vol %, 20 vol %, 30 vol %, 40 vol %, or 50 vol % of the plurality of discrete magnetic particles. The magnetically anisotropic film may contain a large number of discrete magnetic hexaferrite particles, such as about 100, about $10^3$, about $10^4$, about $10^5$, about $10^6$, about $10^7$, or more.

"Hexaferrite" or equivalently "hexagonal ferrite" is a ceramic compound with a hexagonal crystal structure, composed of iron oxide ($Fe_2O_3$) combined chemically with one or more additional metallic elements in a hexagonal crystal structure. A hexagonal crystal structure is well-known in the art, with a hexagonal lattice system having one six-fold axis of rotation. Examples of hexaferrites include barium ferrite, $BaFe_{12}O_{19}$, and strontium ferrite, $SrFe_{12}O_{19}$.

The magnetic hexaferrite particles may be nanoparticles or microparticles. Magnetic hexaferrite nanoparticles may have an average particle size from about 10 nanometers to about 1000 nanometers, measured as the width (long dimension). Magnetic hexaferrite microparticles may have an average particle size from about 1 micron to about 100 microns, measured as the width. In some embodiments, the magnetic hexaferrite particles have an average particle size from about 100 nanometers to about 5 microns, measured as the width. Magnetic hexaferrite particles may have an average particle thickness (short dimension) from about 1 nanometer to about 10 microns, such as from about 10 nanometers to about 1000 nanometers, for example. In the case of hexagonal prisms, the thickness is the height of the prism, which is usually less than the prism width.

In certain embodiments, the magnetic hexaferrite particles are referred to as platelets or nanoplatelets. A "platelet" is a polygonal prism. The polygonal prisms may be hexagonal prisms with 8 faces, 18 edges, and 12 vertices. Other polygonal prisms may be present. The polygonal prisms will be hexagonal prisms when they contain single crystals that have hexagonal crystal structure. However, the present invention is not limited to single-crystal materials. The presence of crystal defects, grain boundaries, and impurities (including other types of crystals and amorphous regions) means that the particles themselves may be of various shapes.

The magnetic hexaferrite particles may have a variety of particle shapes. In preferred embodiments, the particles are polygonal prisms. Exemplary polygonal prisms are thin hexagonal plates, wherein the ratio of the plate thickness to plate length is from about 1:20 to about 1:200.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

"Discrete" particles means that the particles are physically separate particles. There may be gaps (of space, liquid solvent, or materials) between discrete particles. Discrete particles may be adjacent to one another and there may be some amount of contact area, but that the particles are not physically fused together or physically continuous with each other. Physically continuous or physically fused particles are characterized by significant covalent bonding between particles, i.e., chemical bonds involving the sharing of electrons between atoms. The discrete particles herein may touch but do not form significant covalent bonds between one another. By "significant covalent bonding" between two particles, it is meant that the two particles do not remain as physically separate particles but rather have become one larger particle, as observed by scanning electron microscopy (SEM).

Figure 3:
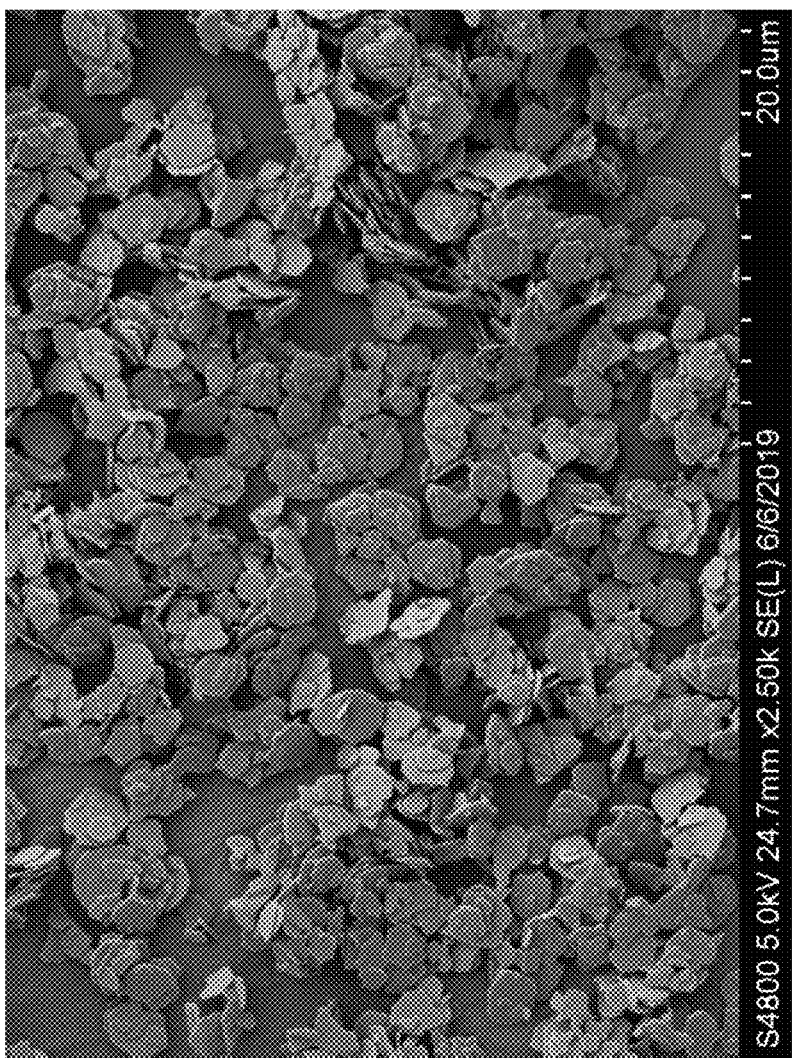
FIG. 3 is a SEM image (scale bar=20 μm) of individualized, isolated $SrFe_{12}O_{19}$ platelets following thermal treatment at 1100° C. for 2 hours, and then mechanical agitation, in Example 1.

An illustration of discrete particles is shown in the SEM image of FIG. 3 (Example 1). In FIG. 3, discrete hexaferrite platelets are shown as produced via mechanical strain. Some of the platelets are completely isolated from other platelets, while some platelets are physically touching each other but remain distinctly observable as hexagonal shapes. Discrete particles may be loosely agglomerated but not covalently bonded (tightly agglomerated). In some embodiments, discrete particles are crystallographically discontinuous across an interface so that adjacent particles have non-epitaxial interfaces.

By contrast, an example of non-discrete particles can be seen in FIGS. 2B and 2C of U.S. Patent App. Pub. No. 2010/0173101 to Harris et al., published Jul. 8, 2010 (hereinafter, "Harris"), which is hereby incorporated by reference. In the SEM images shown in Harris, the initially finely-grained magnetic particles have fused together to form many continuous regions. The particles do not remain as physically separate particles but rather have become larger particles. This is observable in FIGS. 2B and 2C of Harris because there are domains of significantly varying size (from about 1 micron to about 10 microns) and there is no evidence of individual, finely-grained particles that were used in the synthesis (FIG. 2A of Harris). Harris at paragraph [0041] even teaches that "in FIG. 2B, the grains have grown in size, especially along the film plane, and the film appears to have a higher density, demonstrative of the appreciable and advantageous densification and grain growth that occurs as a result of the high-temperature sintering steps." The thermal treatment during film formation by Harris causes particle annealing or sintering that results in fused nanoparticles—not discrete particles—within the film. Without being limited by theory, it is believed that following film formation, hexaferrite particles cannot remain discrete under film sintering at temperatures exceeding 500° C.

The magnetic hexaferrite film thickness may vary from about 1 micron to about 5 millimeters, such as from about 10 microns to about 200 microns. In some embodiments, the magnetic hexaferrite film thickness is at least 30 microns. The lateral dimension of the film may vary widely, from 50 microns to hundreds of millimeters or even meters.

A "magnetically anisotropic" structure or material means that the structure or material exhibits magnetic properties (remanence and coercivity) that is different out of plane from in plane. In this disclosure, a magnetically anisotropic structure or material is characterized by a remanence-to-saturation magnetization ratio—the ratio of remanent magnetization to saturation magnetization—of at least 0.5, as measured through the thickness of the material, perpendicular to the substrate surface (not longitudinal to the surface). Out-of-plane magnetic squareness with a ratio of remanent magnetization to saturation magnetization of at least 0.7 means there is strong and permanent out-of-plane magnetization.

The magnetically anisotropic film may be characterized by a remanence-to-saturation magnetization ratio that is at least 0.5, preferably at least 0.6, and more preferably at least about 0.7. In this disclosure, in reference to remanence-to-saturation magnetization ratio, "at least about 0.7" means at least 0.65, 0.66, 0.67, 0.68, or 0.69. Unless otherwise noted, all references to remanence-to-saturation magnetization ratio are in reference to the out-of-plane remanence-to-saturation magnetization ratio.

In certain embodiments, the hexaferrite particles are characterized by a remanence-to-saturation magnetization ratio greater than 0.80 or greater than 0.85. This high ratio is useful for self-biased hexaferrite particles. "Self-biased hexaferrite" means that the material intrinsic remanent magnetization is strong enough to eliminate the need for an external magnetic bias field (typically from a permanent magnet). Self-biasing is generally defined as a material with a remanence-to-saturation ratio greater than 0.85.

The discrete magnetic hexaferrite particles may exhibit an average saturation magnetization from about 25 emu/g to about 65 emu/g, measured at 25° C. In various embodiments, the discrete magnetic hexaferrite particles exhibit an average saturation magnetization of about, or at least about, 25, 30, 35, 40, 45, 50, 55, 58, 59, 60, 61, 62, or 65 emu/g, including all intervening ranges, measured at 25° C. In some embodiments, the magnetically anisotropic film is characterized by a saturation magnetization that is greater than 50 emu/g, measured at 25° C.

The discrete magnetic hexaferrite particles may exhibit an average magnetic coercivity from about 600 Oe to about 5000 Oe, measured at 25° C. In various embodiments, the discrete magnetic hexaferrite particles exhibit an average magnetic coercivity of about, or at least about, 600, 1000, 1500, 2000, 2500, 3000, 3500, 4000, 4500, or 5000 Oe, including all intervening ranges, measured 25° C.

The substrate may be fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof. A substrate may be a material within a printed circuit board that mechanically supports and electrically connects components using conductive tracks, pads, and/or other features etched from one or more conductive layers laminated onto and/or between layers of the substrate. The substrate may be a release film with low adhesion. In some embodiments, for example, the substrate is a low-adhesion release film, such as biaxially-oriented polyethylene terephthalate or another polyester.

In some embodiments, the magnetically anisotropic film is immobilized onto the substrate with a coating applied to the magnetically anisotropic film and/or to the substrate. The coating may contain a material selected from the group consisting of gold, palladium, silica, alumina, hafnia ($HfO_2$), and combinations thereof, for example.

The amount of substrate may vary widely within the overall magnetically anisotropic structure. The magnetically anisotropic structure may contain at least, or at most, about 5 wt %, 10 wt %, 20 wt %, 30 wt %, 40 wt %, 50 wt %, 60 wt %, 70 wt %, 80 wt %, 90 wt %, 95 wt %, or 99 wt % of substrate.

In some embodiments, the magnetically anisotropic film is encapsulated by a polymer selected from the group consisting of epoxies, silicones, poly(p-xylylene), and combinations thereof. Other polymers may be used for encapsulating the film.

The magnetically anisotropic film may be an element of a microelectronics component selected from the group consisting of a circulator, an isolator, a non-reciprocal component, and a biasing magnet.

In some embodiments, the magnetically anisotropic structure is disposed on or within an integrated-circuit chip. The magnetically anisotropic film may be monolithically integrated into an integrated-circuit process in which the maximum processing temperature after transistor fabrication is below 500° C., and preferably below 250° C. Because the maximum processing temperature is 500° C. or less, and preferably 250° C. or less, the components of the integrated-circuit chip are not damaged.

Fabrication of magnetically anisotropic structures will now be further described in exemplary detail, without limiting the scope of the invention. Hexaferrite nanoparticles may be synthesized using the following techniques, for example, without limitation.

A reaction mixture during synthesis of hexaferrite particles is typically contained in a sealed reaction vessel, which may be at atmospheric pressure or under pressure or vacuum. In various embodiments, the reaction mixture during reaction is under a pressure selected from about 0.1 atm to about 10 atm, such as about 0.5 atm to about 5 atm, or about 1 atm. The reaction temperature during synthesis may be selected from about 100° C. to about 350° C., such as from about 200° C. to about 300° C. In various embodiments, the reaction temperature is about 125° C., 150° C., 175° C., 200° C., 225° C., 250° C., 275° C., 300° C., 325° C., 350° C., or 375° C. The synthesis may utilize a variety of types of reaction vessels, such as, but not limited to, batch reactors, semi-batch reactors, continuous stirred-tank reactors, and continuous tubular reactors. The reactor may be agitated or non-agitated.

In some embodiments to fabricate $BaFe_{12}O_{19}$ particles, barium nitrate (e.g., 0.1 mmol) and iron nitrate nonahydrate (e.g., 0.5 mmol) are dissolved in deoxygenated water (e.g., 1 mL). Sodium hydroxide (e.g., 25.7 mmol) and a ligand such as citric acid, ethylenediaminetetraacetic acid (EDTA), and/or ammonium thiocyanate (e.g., 0.24 mmol) are dissolved in deoxygenated water (e.g., 9 mL) with vigorous stirring. The sodium hydroxide solution is purged with nitrogen continuously while stirring for at least 10 minutes to inhibit the formation of barium carbonate later in the synthesis. The barium and iron nitrate solution is added drop by drop to the sodium hydroxide solution while stirring. The mixture is heated to 270° C. in a reactor, such as a Teflon-lined Parr vessel, for a suitable reaction time. Then the mixture is cooled to room temperature, and washed sequentially with nitric acid (e.g., 10 mM), acetone, and deionized water. The final $BaFe_{12}O_{19}$ particles are resuspended in deionized water.

In some embodiments to fabricate $SrFe_{12}O_{19}$ particles, strontium chloride hexahydrate (e.g., 0.1 mmol) and iron chloride hexahydrate (e.g., 0.8 mmol) are dissolved in deoxygenated water (e.g., 1 mL). Sodium hydroxide (e.g., 58.3 mmol) is dissolved in deoxygenated water (e.g., 9 mL) with vigorous stirring. The sodium hydroxide solution is purged with nitrogen continuously while stirring for at least 10 minutes. The strontium and iron chloride solution is added drop by drop to the sodium hydroxide solution while stirring. The mixture is heated to 270° C. in a reactor, such as a Teflon-lined Parr vessel, for a suitable reaction time. Then the mixture is cooled to room temperature, and washed sequentially with nitric acid (e.g., 10 mM), acetone, and deionized water. The final $SrFe_{12}O_{19}$ particles are resuspended in deionized water.

Typically, it is desired to employ only $BaFe_{12}O_{19}$ particles, only $SrFe_{12}O_{19}$ particles, or only another type of hexaferrite particles, such as $BaCa_2Fe_{16}O_{27}$, $BaFe_{12-2x}Co_xTi_xO_{19}$ ($0 \leq x \leq 1$), $BaFe_{12-2x}Ru_xTi_xO_{19}$ ($0 \leq x \leq 1$), etc. A mixture of particles, such as $BaFe_{12}O_{19}$ and $SrFe_{12}O_{19}$ particles, may be desirable if particles are sized differently and therefore pack better, for example. Some embodiments utilize a chemical composition in which both barium and strontium are present in the crystal structure, $Ba_xSr_{1-x}Fe_{12}O_{19}$ ($0<x<1$). A single composition and crystal orientation of hexaferrite particles may be referred to as "single-phase hexaferrite particles." Single-phase hexaferrite particles, as determined by x-ray diffraction, are preferred.

Preferably, the hexaferrite particles are characterized by an average crystalline hexaferrite content of at least 80 wt %. In less-preferred embodiments, the average hexaferrite content is from about 60 wt % to 80 wt %. In certain preferred embodiments, the hexaferrite particles are characterized by an average hexaferrite content of at least 90 wt %, at least 95 wt %, at least 99 wt %, or essentially 100 wt %. Note that the calculation of hexaferrite content does not include any ligands attached to the hexaferrite particles.

When the hexaferrite content of the particles is less than 100 wt %, the other material may be iron oxides (e.g., FeO, $Fe_3O_4$, or $Fe_2O_3$), barium oxides, strontium oxides, or impurities, for example. The material that is not hexaferrite may be crystalline or amorphous. As an example, $Fe_2O_3$ may be present within the hexaferrite particles, and that $Fe_2O_3$ itself may be crystalline or amorphous.

The crystallinity of the hexaferrite particles is distinct from the hexaferrite content since it is possible for the particles to contain amorphous regions of $BaFe_{12}O_{19}$ and/or $SrFe_{12}O_{19}$. As used herein, the "crystallinity" of the particles, and "crystalline hexaferrite" refer specifically to a hexagonal crystal structure, as measured by x-ray diffraction. Therefore, other crystal structures (such as trigonal crystals of $Fe_2O_3$) are not counted in the definition of crystallinity, or counted toward crystalline hexaferrite content. In various embodiments, the hexaferrite particles are characterized by an average percent of crystalline hexaferrite of at least 70%, at least 80%, at least 90%, at least 95%, or at least 99%.

The synthesized hexaferrite particles preferably have crystalline domain sizes of at least 30 nm, as estimated using the Scherrer equation on x-ray diffraction data. The Scherrer equation is a formula that relates the size of sub-micron particles, or crystallites, in a solid to the broadening of a peak in a diffraction pattern. The Scherrer equation is well-known; see Patterson, "The Scherrer Formula for X-Ray Particle Size Determination", *Phys. Rev.* 56 (10): 978-982, 1939, which is hereby incorporated by reference herein. In various embodiments, the synthesized hexaferrite particles have an average crystalline domain size of at least 10, 20, 30, 40, 50, 75, 100, 150, 200, 300, 400, 500, 600, 700, 800, or 900 nm.

The synthesized hexaferrite particles are typically shaped like hexagonal plates, with the c-axis (crystal orientation) being along the thickness of the plate. The hard magnetic axis for hexaferrites is along the c-axis, which is normal to the platelet surface. The hexaferrite particles are preferably characterized by magnetocrystalline anisotropy along the c-axis of the hexagonal structure.

Pullar, "Hexagonal ferrites: A review of the synthesis, properties and applications of hexaferrite ceramics", *Progress in Materials Science* 57 (2012) 1191-1334 is hereby incorporated by reference for its teachings of hexaferrite particle compositions. In various embodiments herein, in place of $BaFe_{12}O_{19}$ or $SrFe_{12}O_{19}$—or in addition to these hexaferrites—the hexaferrite particles may contain one or more cobalt-titanium-substituted $BaFe_{12-2x}Co_xTi_xO_{19}$ ($0<x<2$) or $SrFe_{12-2x}Co_xTi_xO_{19}$ ($0<x<2$); Z-type ferrites, such as $Ba_3Co_2Fe_{24}O_{41}$; Y-type ferrites, such as $Ba_2Co_2Fe_{12}O_{22}$; W-type ferrites, such as $BaCo_2Fe_{16}O_{27}$; X-type ferrites, such as $Ba_2Co_2Fe_{28}O_{46}$; and/or U-type ferrites, such as $Ba_4Co_2Fe_{36}O_{60}$.

The hexaferrite particles may be synthesized in a solution with no additional ligands or surfactants, or with ligands such as (but not limited to) oleic acid, dodecylbenzenesulfonic acid, citric acid, EDTA, ammonium thiocyanate, and/or sodium oleate. Note that ammonium thiocyanate ($NH_4SCN$) is not organic as defined herein. The ligand (including components, atoms, or molecules thereof) is preferably not incorporated into the crystal structure of the hexaferrite particles, but rather is only bonded to the surface of the hexaferrite particles. The hexaferrite-ligand bond may be a chemical bond, an electrostatic bond, or physical adsorption (van der Waals forces).

In some embodiments, magnetic hexaferrite particles are obtained from a source, i.e. previously synthesized and/or synthesized by another entity. In some embodiments, magnetic hexaferrite particles are synthesized using procedures described in commonly owned U.S. patent application Ser. No. 16/203,788, filed on Nov. 29, 2018 (now allowed), which is hereby incorporated by reference herein.

The synthesized hexaferrite particles preferably exhibit an average saturation magnetization between 25 and 65 emu/g. In various embodiments, the synthesized hexaferrite particles exhibit an average saturation magnetization of about, or at least about, 25, 30, 35, 40, 45, 50, 55, 60, or 65 emu/g, including all intervening ranges (e.g., 30-60 emu/g).

The synthesized hexaferrite particles preferably exhibit an average magnetic coercivity between 600 and 5000 Oe. In various embodiments, the synthesized hexaferrite particles exhibit an average magnetic coercivity of about, or at least about, 600, 800, 1000, 1500, 2000, 2500, 3000, 3500, 4000, 4500, or 5000 Oe, including all intervening ranges (e.g., 1000-4000 Oe). In some embodiments, the synthesized hexaferrite particles exhibit an average magnetic coercivity of at least 1000 Oe, at least 2000 Oe, or at least 3000 Oe.

The synthesized hexaferrite particles may be mechanically treated to create isolated, individual particles. Mechanical treatment is preferred when the hexaferrite particles undergo secondary nucleation during synthesis, resulting in intergrown platelets that are perpendicular or at random angles to one another (see FIG. 2). Consequently, assembled films from those platelets would have low density due to poor packing fraction and would contain crystallites with the axis of magnetocrystalline anisotropy along directions that are not parallel to the axis of magnetocrystalline anisotropy of other platelets. In order to achieve a film with high magnetic anisotropy, the intergrown platelets are preferably separated into individual plates by breaking apart the intergrown plates through mechanical agitation. Without such physical separation of intergrown platelets, alignment of the platelets is not possible geometrically. In some cases, the synthesized hexaferrite particles do not contain, or contain very little, intergrown platelets, in which case mechanical treatment is not necessary.

Mechanical treatment may be conducted prior to addition to solvent, or following solvent addition (i.e., the dispersed particles are mechanically treated in the solvent). Mechanical treatment prior to solvent addition may utilize another liquid to aid in breaking apart particles, or may be done with dry particles. Mechanical treatment of hexaferrite particles generally improves their dispersion in the solvent, by generating unagglomerated platelets.

Following synthesis of the hexaferrite particles, they may be dispersed in a solvent. The solvent may be selected from polar protic solvents, polar aprotic solvents, or a combination thereof. The solvent may be an alcohol or an organic acid, for example. In some embodiments, the solvent is selected from the group consisting of water, ethanol, n-butanol, tert-butanol, isobutanol, isopropanol, dimethyl sulfoxide, toluene, acetic acid, formic acid, acetone, tetrahydrofuran, and combinations thereof.

Any reference to a "solution" of hexaferrite particles and a solvent is equivalent herein to a "dispersion" of hexaferrite particles in the liquid solvent, in which the hexaferrite particles are not necessarily dissolved (dissolution), but may be dispersed or suspended in the liquid solvent.

The concentration of hexaferrite particles in the solution may be from about 0.1 mg/mL to about 100 mg/mL, such as from about 0.5 mg/mL to about 50 mg/mL, for example.

There are other techniques to improve particle dispersion or dissolution in the solution, which may be done instead of, or in addition to, mechanical treatment. In some embodiments, the synthesized hexaferrite particles aggregate due to inherent magnetization within platelets. Such platelets may be separated into unagglomerated platelets through a degaussing mechanism. Degaussing is the process of decreasing or eliminating a remanent magnetic field, using a controlled magnetic field.

The synthesized hexaferrite particles may be treated with a ligand to improve dispersion. For example, the hexaferrite particles may be heated in a bath of dodecylbenzenesulfonic acid to a temperature of 50-150° C. for 1-4 hours. Note that treatment of the synthesized hexaferrite particles with a ligand is different from the option to utilize a ligand during synthesis of hexaferrite particles in solution. Whether or not a ligand is included in the initial synthesis, the synthesized hexaferrite particles may be treated with a ligand, which may be the same or different from any ligand(s) initially used.

In some embodiments, an organic binder or an inorganic binder is included in the solution. Exemplary binders include, but are not limited to, bisphenol A-epoxy resins, polymethyl methacrylate, and polydimethylsiloxane. An exemplary bisphenol A-epoxy resin is ULTRATHIN 2 Epoxy Resin (PACE Technologies, Tucson, Ariz., USA).

The dispersion of hexaferrite particles is preferably deposited onto a substrate in an aligned manner. The substrate may be any suitable solid material, such as a glass slide, a fused silica wafer, a silicon wafer, a gallium nitride wafer, or a gallium arsenide wafer. The substrate is typically a flat or substantially flat surface, but could be curved, especially at the large scale of a device for which deviations from flatness do not negatively impact the magnetic properties of the hexaferrite films. In some embodiments, the substrate is a low-adhesion release film, such as biaxially-oriented polyethylene terephthalate or another polyester.

In some embodiments, the dispersion of hexaferrite particles is dried onto the substrate, in which the capillary forces during the drying process create a film of aligned and stacked plates. Optionally, the substrate-deposited hexaferrite particles may be dried between two magnets, under a magnetic-induction field ranging from 0.02 T to 1.5 T, for example. The magnetic field lines are much more uniform between two magnets, compared to one magnet. Optionally, the substrate-deposited hexaferrite particles may be dried between two electromagnets, under a varying magnetic field, ranging from 0 T to 1.5 T. A gradual ramp in magnetic field creates a more-controlled environment in which the particles may align with the substrate.

Some variations of the invention provide a method of making a magnetically anisotropic structure, the method comprising:

(a) synthesizing or obtaining magnetic hexaferrite particles;

(b) thermally treating the magnetic hexaferrite particles at a treatment temperature of at least 800° C.;

(c) if the magnetic hexaferrite particles are agglomerated, mechanically treating the magnetic hexaferrite particles to form discrete particles;

(d) combining the magnetic hexaferrite particles with a solvent and an organic binder, to generate a dispersion; and (e) in the presence of a magnetic field, depositing the magnetic hexaferrite particles onto a substrate, to generate a magnetically anisotropic film of aligned, discrete magnetic hexaferrite particles disposed on the substrate, wherein the maximum processing temperature during step (c), step (d), and step (e) is 500° C. or less.

The treatment temperature during step (b) may be about, at least about, or at most about, 800° C., 850° C., 900° C., 950° C., 1000° C., 1050° C., 1100° C., 1150° C., or 1200° C., including all intervening ranges (e.g., 800-1100° C.). A furnace, an oven, an induction heater, or another apparatus for thermally treating the magnetic hexaferrite particles may be employed. The thermal treatment is utilized to anneal the magnetic hexaferrite particles. By "anneal" in this disclosure, it is meant that the particles may undergo various chemical and/or physical reactions including annealing, sintering, calcining, crystallizing, solid-phase transitioning, or purifying (hexaferrite enrichment).

In alternative embodiments, a lower thermal treatment temperature, selected from about 500° C. to less than 800° C., such as about 550° C., 600° C., 650° C., 700° C., or 750° C., is employed, with a longer treatment time being generally necessary.

The processing temperature during step (c) may be about, or less than about, 800° C., 700° C., 600° C., 500° C., 400° C., 300° C., 200° C., 150° C., 100° C., 75° C., 50° C., or 25° C., including all intervening ranges. The processing temperature during step (c) may be the same as the treatment temperature during step (b) and preferably is lower than the step (b) temperature.

Independently of steps (b) and (c), the processing temperature during step (d) may be about, or less than about, 800° C., 700° C., 600° C., 500° C., 400° C., 300° C., 200° C., 150° C., 100° C., 75° C., 50° C., or 25° C., including all intervening ranges. The processing temperature during step (d) may be the same as the treatment temperature during step (c), lower than the step (c) temperature, or higher than the step (c) temperature. The step (d) temperature is preferably is lower than the step (b) temperature.

Independently of steps (b), (c), and (d), the processing temperature during step (e) may be about, or less than about, 500° C., 450° C., 400° C., 350° C., 300° C., 250° C., 200° C., 150° C., 100° C., 75° C., 50° C., 25° C., 0° C., −25° C., or −50° C., including all intervening ranges. The temperature employed in step (e) will typically be dictated, at least in part, by the volatility of the solvent in the dispersion. For highly volatile solvents, lower temperatures may be used. Some embodiments allow for drying a wet paste in step (e) within an applied magnetic field at room temperature, such as about 25° C.

In some embodiments, the maximum processing temperature during steps (c)-(e) may be 500° C., 450° C., 400° C., 350° C., 300° C., 250° C., 200° C., 175° C., 150° C., 125° C., 100° C., 75° C., 50° C., 40° C., 30° C., 25° C., 20° C., 10° C., or 0° C., including any intervening ranges.

FIG. 1 is a flowchart for an exemplary method to form a magnetically anisotropic structure with a hexaferrite film, in some variations. According to FIG. 1, crystalline hexaferrite platelets of $SrFe_{12}O_{19}$ or $BaFe_{12}O_{19}$ are first synthesized. The magnetic hexaferrite particles are thermally treated at a temperature of at least 800° C. If necessary, the hexaferrite platelets are treated under mechanical strain (e.g., agitation) to isolate the hexaferrite particles as discrete platelets. A stable dispersion of discrete hexaferrite particles in solvent and organic binder is created. Discrete hexaferrite platelets are deposited onto a substrate, in the presence of a magnetic field, to generate a hexaferrite film of aligned, discrete magnetic hexaferrite particles. The result is a magnetically anisotropic structure.

In some embodiments, the discrete magnetic hexaferrite particles have a packing density of at least 50% within the magnetically anisotropic film. The "packing density" is defined as the percentage of maximum theoretical volumetric packing for a given particle type. A packing density of 100% therefore means that the particles are perfectly packed. However, there will typically be some void volume, depending on the geometry of the particles; thus, the packing density will typically be less than 100%. In various embodiments, the discrete magnetic hexaferrite particles have a packing density of about, or at least about, 55%, 60%, 65%, 70%, 75%, 80%, 85%, 90%, 95%, or 99%.

In some embodiments, the discrete magnetic hexaferrite particles are stacked in the direction perpendicular to the substrate surface, i.e., the hexaferrite particles are stacked substantially in the direction of the c-axis (normal to the a-axes). Stacked hexaferrite particles may form multiple layers of hexaferrite particles, such as at least 2, 3, 4, 5, 6, 7, 8, 9, or 10 layers, or more. The hexaferrite film preferably contains hexaferrite particles that are both packed and stacked. In certain embodiments, the hexaferrite film contains a single layer of hexaferrite particles that are packed, but not stacked.

The hexaferrite film preferably contains hexaferrite particles that are aligned. "Aligned" hexaferrite particles, in this disclosure, means that the c-axis of the hexaferrite particles have a full width at half maximum angular distribution with respect to the average c-axis direction of at most ±20°. In some embodiments, the hexaferrite particles in each layer of the hexaferrite film are characterized by a full width at half maximum angular distribution of the hexaferrite particle c-axis direction of about ±20° or less, such as about ±15° or less, about ±10° or less, or about ±5° or less. In the case of hexagonal shapes, the hexaferrite particles in each layer of the hexaferrite film may be characterized by a full width at half maximum angular distribution of the hexaferrite particle c-axis direction of about ±20° or less, such as about ±15° or less, about ±10° or less, or about ±5° or less. A direction normal to the c-axis for a hexagonal platelet is known as an a-axis (plate axis). Note that there are multiple directions normal to the c-axis which are referred to a-axes. The degree of alignment of a-axes will correlate with the degree of alignment of c-axes, although there can be a difference when various particle sizes and imperfections are present. In the case of hexagonal particles, the thickness is along the c-axis of the particles and is generally much smaller than the particle width (long axis).

In some embodiments, at least 10%, 20%, 30%, 40%, 50%, 60%, 70%, 80%, 90% or more of the hexaferrite particles are substantially aligned with each other. By "substantially aligned" it is meant that two hexaferrite particles are aligned within 5% of each other, measured by the angle between long axes of the two hexaferrite particles.

In some embodiments, at least 10%, 20%, 30%, 40%, 50%, 60%, 70%, 80%, 90% or more of the hexaferrite particles are completely aligned with each other. By "completely aligned" it is meant that two hexaferrite particles are aligned within 1% of each other, measured by the angle between long axes of the two hexaferrite particles. "Perfectly aligned" hexaferrite particles, in principle, are aligned with each other, within measurement error of the angle between the two long axes.

Another measure of hexaferrite particle alignment is the standard deviation of hexaferrite particle long axis angle from the average long axis direction defined by all hexaferrite particles collectively. In the theoretical case of perfect alignment of many hexaferrite particles, the standard deviation is zero. In some embodiments, the standard deviation of hexaferrite particle long axis angle from the average long axis direction defined by all hexaferrite particles collectively is about, or less than about, 25%, 20%, 15%, 10%, 5%, 4%, 3%, 2%, 1%, 0.5%, or 0.1%.

The hexaferrite film preferably contains hexaferrite particles that are monodisperse, not polydisperse. In some embodiments, monodisperse hexaferrite particles are characterized by a polydispersity of less than 30%, preferably less than about 20%, and more preferably less than about 10% standard deviation of average particle width (longest particle dimension), calculated as standard deviation of width divided by average width. In these or other embodiments, the hexaferrite particles may be characterized by a polydispersity of less than about 30%, preferably less than about 20%, and more preferably less than about 10% standard deviation of average particle thickness (shortest particle dimension), calculated as standard deviation of thickness divided by average thickness. Monodisperse hexaferrite particles are desirable for better packing and better magnetic properties of the hexaferrite films produced therefrom.

Other variations of the invention provide a magnetically anisotropic structure produced by a process comprising:

(a) synthesizing or obtaining magnetic hexaferrite particles;

(b) thermally treating the magnetic hexaferrite particles at a treatment temperature of at least 800° C.;

(c) if the magnetic hexaferrite particles are agglomerated, mechanically treating the magnetic hexaferrite particles to form discrete particles;

(d) combining the magnetic hexaferrite particles with a solvent and an organic binder, to generate a dispersion; and (e) in the presence of a magnetic field, depositing the magnetic hexaferrite particles onto a substrate, to generate a magnetically anisotropic film of aligned, discrete magnetic hexaferrite particles disposed on the substrate, wherein the maximum processing temperature during step (c), step (d), and step (e) is 500° C. or less.

The overall thickness of the final, assembled structure or object (containing assembled hexaferrite particles) may be from about 10 nm to about 1 cm or more, such as about 50 nm, 100 nm, 250 nm, 500 nm, 750 nm, 1 µm, 10 µm, 20 µm, 25 µm, 30 µm, 40 µm, 50 µm, 75 µm, 100 µm, 500 µm, 1 mm, 1 cm, or larger.

The structure containing assembled hexaferrite particles may be present in a device, material, or system selected from the group consisting of magnets, optical devices, coatings, electronic devices, electrochemical systems, and computers, for example.

EXAMPLES

Example 1: Strontium Hexaferrite Synthesis and Isolation 26.6 mg strontium chloride hexahydrate and 215.8 mg iron chloride hexahydrate are dissolved in 1 mL deoxygenated water via a vortex mixer, making a chloride solution. In a separate container, 2.33 g sodium hydroxide is dissolved in 9 mL deoxygenated water with vigorous stirring. The sodium hydroxide solution is purged with nitrogen continuously while stirring for at least 10 min. The chloride solution is added to the sodium hydroxide solution drop by drop while stirring. Finally, the mixture is transferred to a Teflon liner and sealed in a Parr reaction vessel.

The Parr vessel is then placed inside an oven, and the temperature profile is set to reach 270° C. with a heating rate of 3° C./min. The reaction vessel is held at 270° C. for 10 minutes to produce $SrFe_{12}O_{19}$ nanoparticles, and then cooled down to room temperature. The final solution is washed with 10 mM nitric acid followed by acetone several times. The $SrFe_{12}O_{19}$ hexaferrite nanoparticles are stored in DI water.

Figure 2:
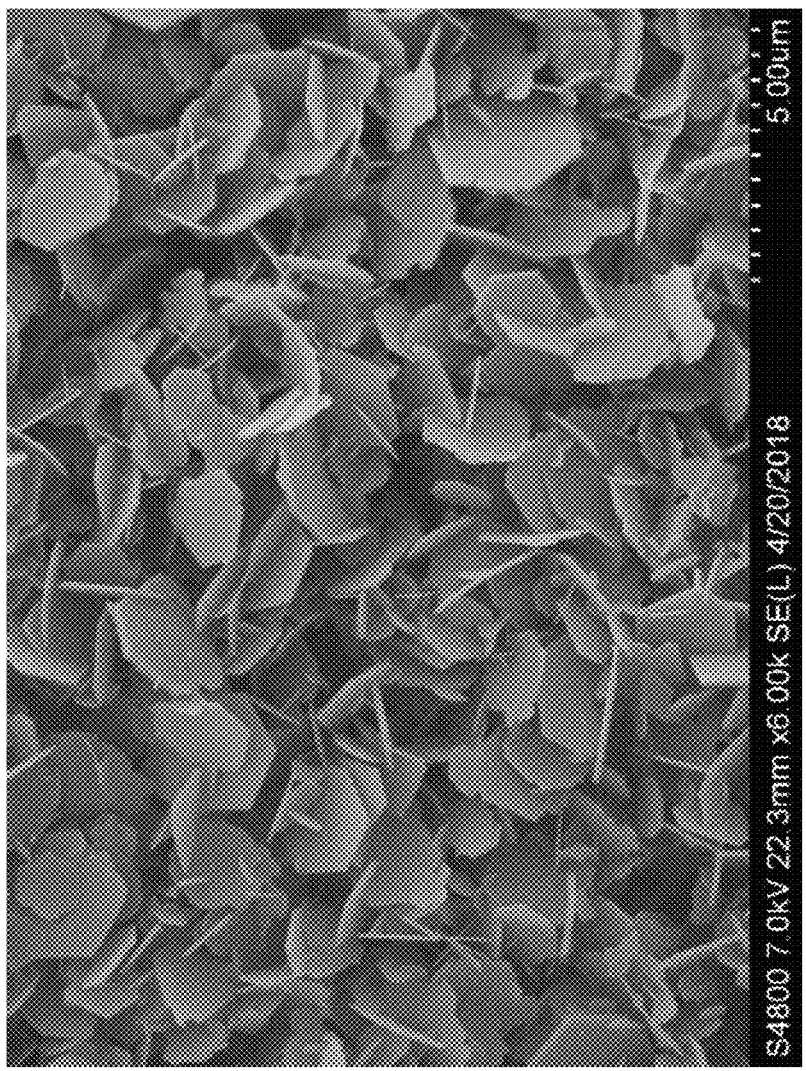
FIG. 2 is a SEM image (scale bar=5 μm) of as-synthesized $SrFe_{12}O_{19}$ nanoparticles, including several intergrown platelets from secondary nucleation, in Example 1.

FIG. 2 shows a scanning electron microscopy (SEM) image (scale bar=5 µm) of as-synthesized $SrFe_{12}O_{19}$ nanoparticles, including several intergrown platelets from secondary nucleation. The c-axes of intergrown platelets, aligned along the thickness of the platelets, are in many different directions.

The $SrFe_{12}O_{19}$ nanoparticles are then thermally treated at 1100° C. for 2 hours, followed by being mechanically agitated and strained to break apart the secondary nucleation. The result is individualized, isolated platelets, as shown in the SEM image (scale bar=20 µm) of FIG. 3. The layer of dried particles in FIG. 3 indicates that the c-axes of the $SrFe_{12}O_{19}$ platelets are substantially randomly aligned.

Figure 4:
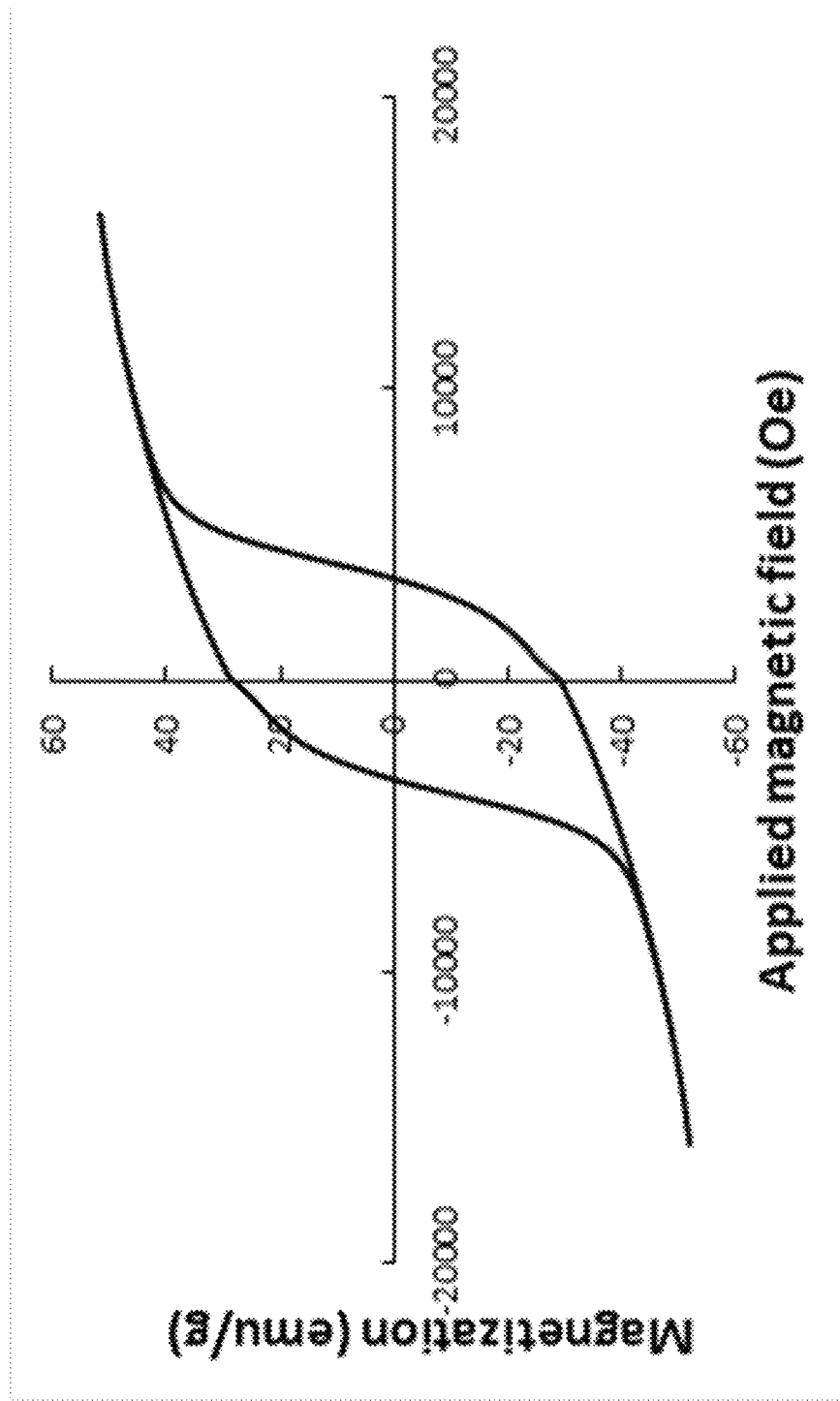
FIG. 4 is a ferromagnetic hysteresis curve of the randomly aligned $SrFe_{12}O_{19}$ platelets, in Example 1.

FIG. 4 is a ferromagnetic hysteresis curve of the randomly aligned $SrFe_{12}O_{19}$ platelets. Vibrating-sample magnetometry (VSM) of the randomly aligned platelets shows a ferromagnetic hysteresis curve with a saturation magnetization of 52 emu/g, coercivity of 3458 Oersted (Oe), and a remanent magnetization of 56% of the saturation magnetization.

Example 2: $SrFe_{12}O_{19}$ Epoxy Film Through Drop-Casting

700 µL of 100 mg/mL discretized $SrFe_{12}O_{19}$ particle solution from Example 1 is prepared in tert-butanol. 33 µL of ULTRATHIN Epoxy (10:1 Part A: Part B), a modified bisphenol A-epoxy resin mixture (PACE Technologies, Tucson, Ariz., USA), is added to the particle solution. The mixture is vortexed for 1 min followed by sonication for 15 min. The particles settle down within a couple of minutes and are vortexed for 30 seconds before deposition. Approximately 100 µL of a particle mixture is drop-casted on a 5 mm×5 mm fused silica substrate. The mixture is air-dried for 15 min to allow roughly 70-80% by weight solvent to flash off. The wet paste is then aligned and cured at room temperature (about 25° C.) in a 1.13 Tesla electromagnetic field for 1 hour.

Figure 5:
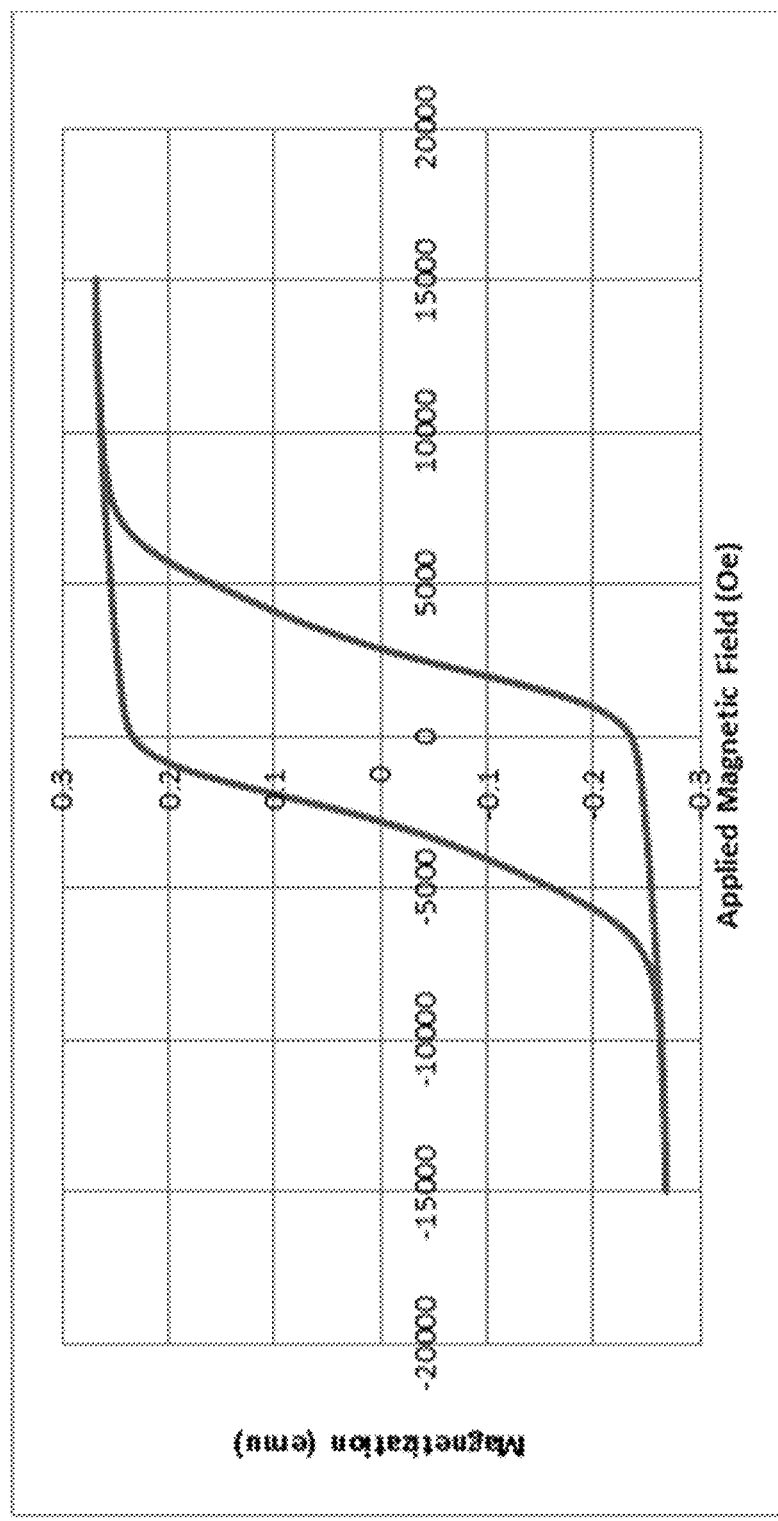
FIG. 5 is a ferromagnetic hysteresis curve of the $SrFe_{12}O_{19}$ dried film, measured through the thickness of the hexaferrite film (perpendicular, out-of-plane), in Example 2.

The aligned and cured film is tested with vibrating-sample magnetometry. FIG. 5 is a ferromagnetic hysteresis curve of the $SrFe_{12}O_{19}$ dried film, measured through the thickness of the film (perpendicular, out-of-plane). The remanence-to-saturation magnetization ratio is calculated from FIG. 5 as 0.88, which is above the 0.85 threshold for self-biased magnets. The high (88%) remanent magnetization is an indication that the particles are well-aligned through the drying process.

Figure 6:
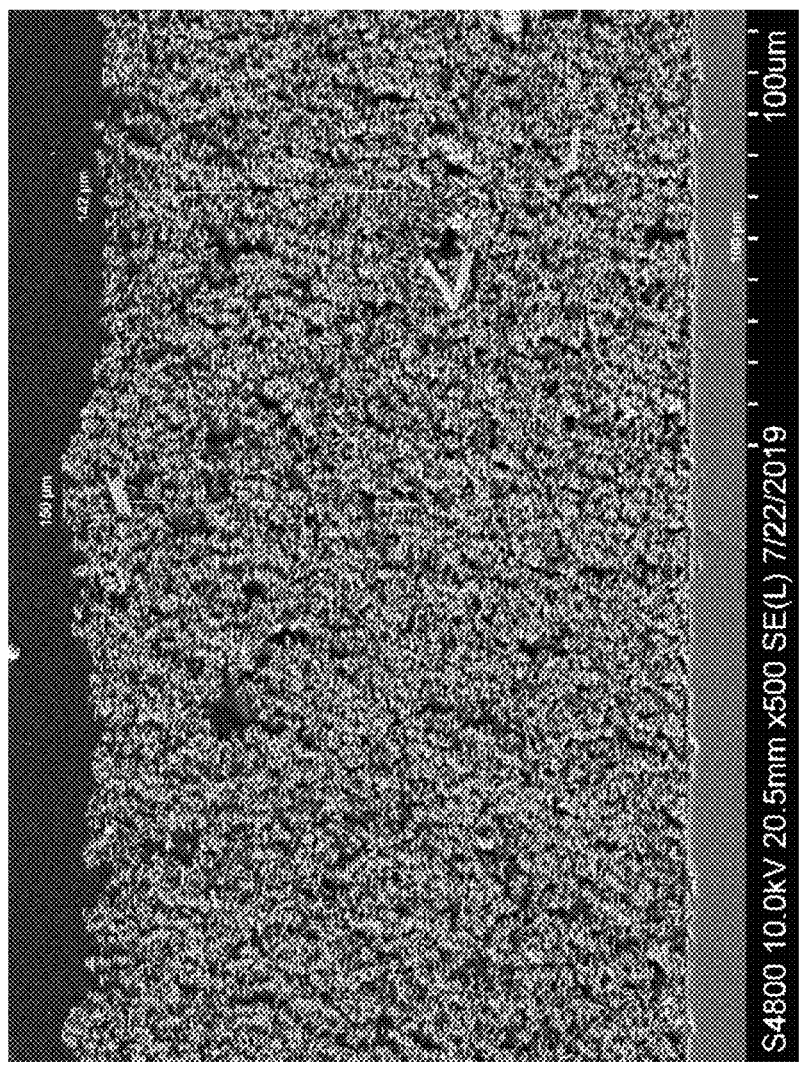
FIG. 6 is a SEM image (scale bar=100 μm) of a cross-sectional side view of the full thickness of the hexaferrite film, in Example 2.

FIG. 6 is a cross-sectional side view of the full thickness of the film using SEM (scale bar=100 microns). The average $SrFe_{12}O_{19}$ film thickness is about 150 µm.

Based on these measurements, the packing density within the $SrFe_{12}O_{19}$ film is estimated to be 79% by weight and 46% by volume. The $SrFe_{12}O_{19}$ film in this example has very high hexaferrite content, high remanent magnetization, out-of-plane magnetic anisotropy, and is a low-temperature-deposited, self-biased film.

Example 3: $SrFe_{12}O_{19}$ Film Through Drying in Container 2 mL of 100 mg/mL discretized $SrFe_{12}O_{19}$ particle solution from Example 1 is prepared in tert-butanol. 33 µL of ULTRATHIN Epoxy (10:1 Part A: Part B), a modified bisphenol A-epoxy resin mixture (PACE Technologies, Tucson, Ariz., USA), is added to the particle solution. The mixture is vortexed for 1 min followed by sonication for 15 min. The particles settle down within a couple of minutes and are vortexed for 30 seconds before deposition. The particle mixture is transferred to a 1-inch×1-inch polyester container which contained six pieces of 5 mm×5 mm fused silica substrate. The particle mixture is air-dried for about 1.5 hours to allow roughly 80% solvent by weight to flash off. The wet paste is aligned and cured at room temperature (about 25° C.) in a 0.68 Tesla electromagnetic field for 2 hours.

Figure 7:
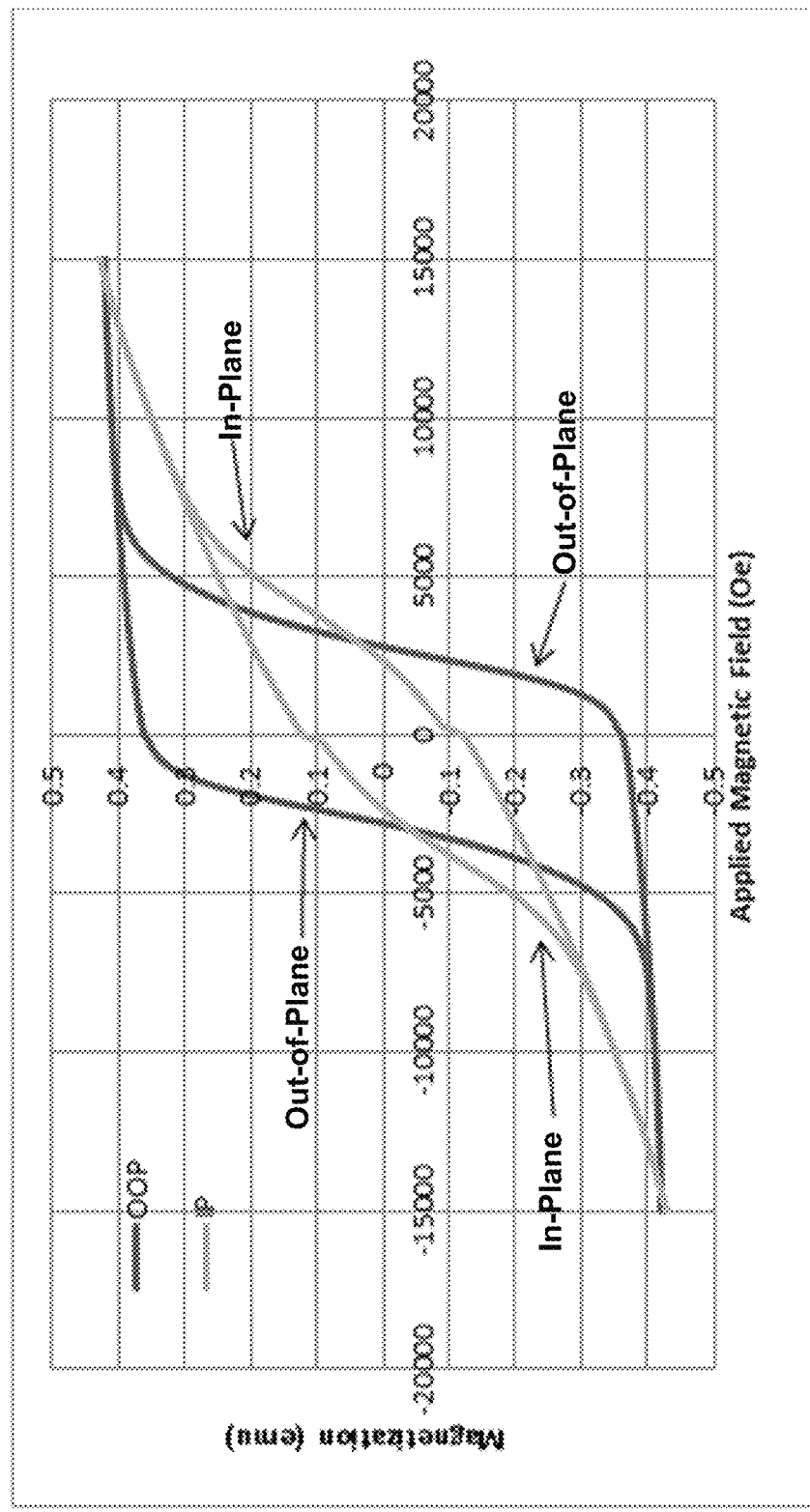
FIG. 7 is a ferromagnetic hysteresis curve of the $SrFe_{12}O_{19}$ dried film, measured both through the thickness of the hexaferrite film (perpendicular, out-of-plane) as well as in-plane, in Example 3.

The aligned and cured film is tested with vibrating-sample magnetometry. FIG. 7 is a ferromagnetic hysteresis curve of the $SrFe_{12}O_{19}$ dried film, measured both through the thickness of the film (perpendicular, out-of-plane) as well as in-plane. The out-of-plane remanence-to-saturation magnetization ratio is calculated from FIG. 7 as 0.86, which is above the 0.85 threshold for self-biased magnets. The high (86%) remanent magnetization is an indication that the particles are well-aligned through the drying process.

Figure 8:
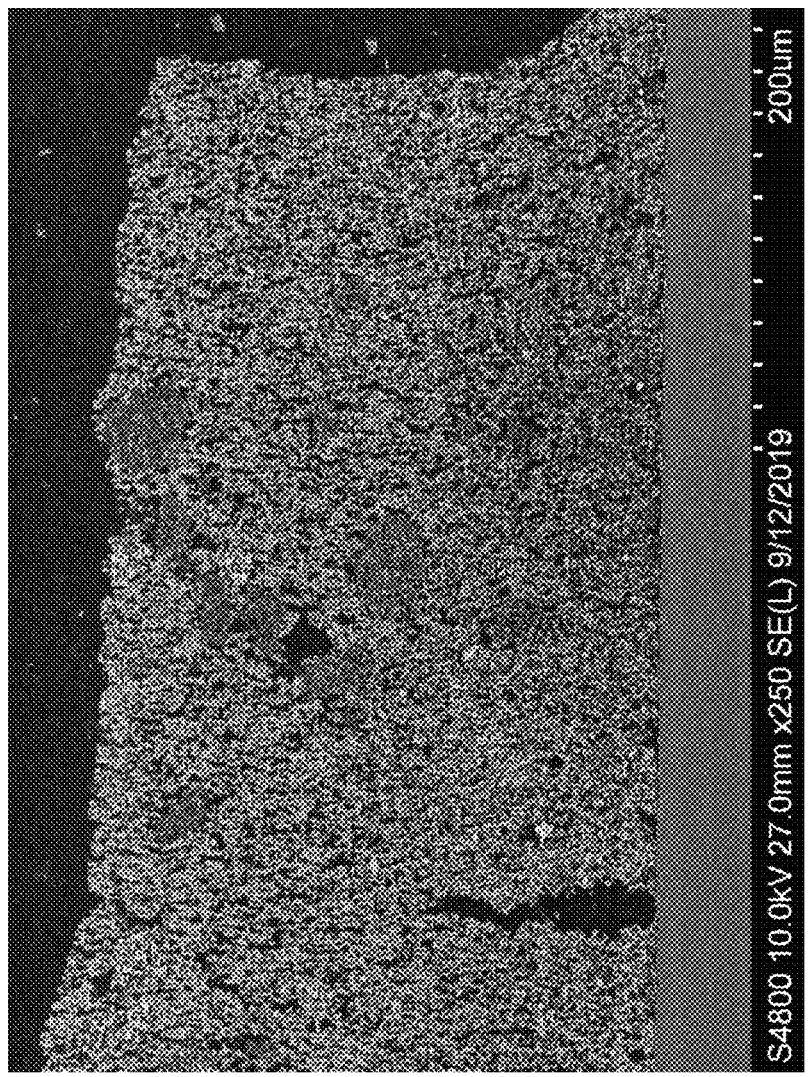
FIG. 8 is a SEM image (scale bar=200 microns) of a cross-sectional side view of the full thickness of the hexaferrite film, in Example 3.

FIG. 8 is a cross-sectional side view of the full thickness of the film using SEM (scale bar=200 microns). The average $SrFe_{12}O_{19}$ film thickness is about 220 µm.

Based on these measurements, the packing density within the $SrFe_{12}O_{19}$ film is estimated to be 65% by weight and 28% by volume. The $SrFe_{12}O_{19}$ film in this example has very high hexaferrite content, high remanent magnetization, out-of-plane magnetic anisotropy, and is a low-temperature-deposited, self-biased film.

Example 4: Free-Standing Composite Film 2 mL of 100 mg/mL discretized $SrFe_{12}O_{19}$ particle solution from Example 1 is prepared in tert-butanol. 660 µL of ULTRATHIN Epoxy (10:1 Part A: Part B), a modified bisphenol A-epoxy resin mixture (PACE Technologies, Tucson, Ariz., USA), is added to the particle solution. The mixture is vortexed for 1 min followed by sonication for 15 min. The particle mixture is left at room temperature with the cap sealed for several hours. The particles settle down, forming a $SrFe_{12}O_{19}$-containing wet paste. The $SrFe_{12}O_{19}$ paste is transferred to a Mylar® (biaxially-oriented polyethylene terephthalate) release film. Another Mylar release film is placed on top, sandwiching the $SrFe_{12}O_{19}$ wet paste in between the two Mylar release films. The sandwiched $SrFe_{12}O_{19}$ wet paste is aligned and cured at room temperature (about 25° C.) in a 1.27 Tesla electromagnetic field for 2 hours.

Figure 9:
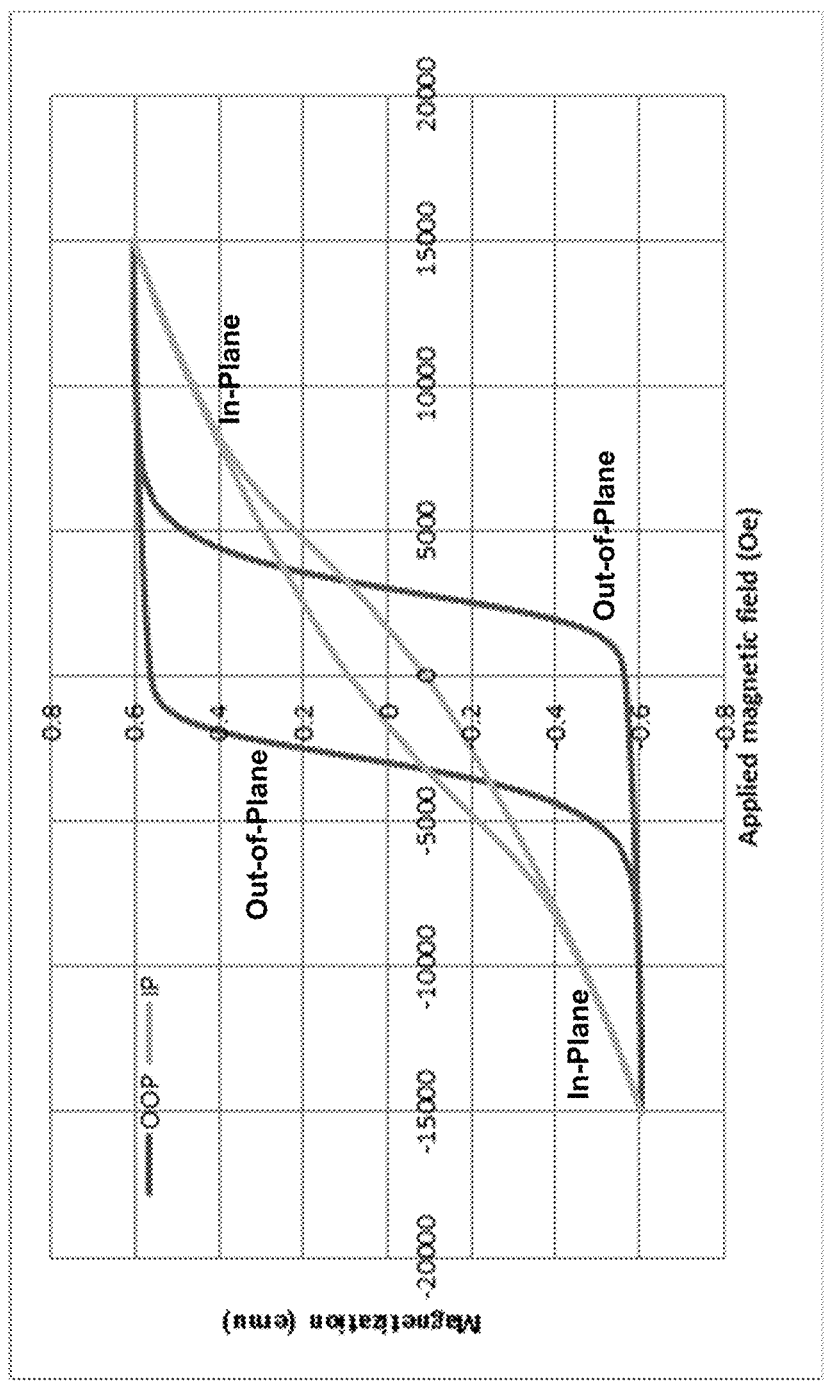
FIG. 9 is a ferromagnetic hysteresis curve of the $SrFe_{12}O_{19}$ dried film, measured both through the thickness of the hexaferrite film (perpendicular, out-of-plane) as well as in-plane, in Example 4.

The aligned and cured film is tested with vibrating-sample magnetometry. FIG. 9 is a ferromagnetic hysteresis curve of the $SrFe_{12}O_{19}$ dried film, measured both through the thickness of the film (perpendicular, out-of-plane) as well as in-plane. The out-of-plane remanence-to-saturation magnetization ratio is calculated from FIG. 9 as 0.93, which is above the 0.85 threshold for self-biased magnets. The high (93%) remanent magnetization is an indication that the particles are well-aligned through the drying process.

Figure 10:
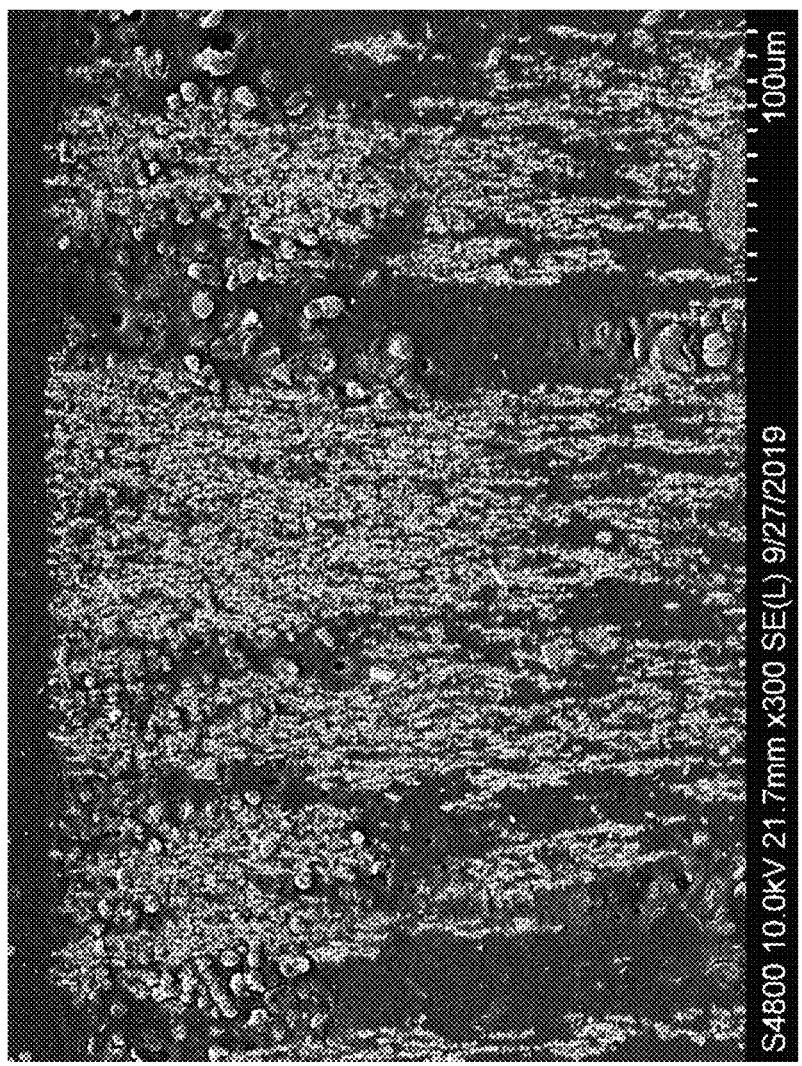
FIG. 10 is a SEM image (scale bar=100 microns) of a cross-sectional side view of the thickness of the hexaferrite film, in Example 4.

FIG. 10 is a cross-sectional side view of the thickness of the film using SEM (scale bar=100 microns). The average $SrFe_{12}O_{19}$ film thickness is about 465 µm.

Based on these measurements, the packing density within the $SrFe_{12}O_{19}$ film is estimated to be 30% by weight and 9% by volume. The $SrFe_{12}O_{19}$ film in this example has high hexaferrite content, very high remanent magnetization, out-of-plane magnetic anisotropy, and is a low-temperature-deposited, self-biased film.

The structures provided herein are useful in a wide variety of applications, including but not limited to magnetic devices, drive motors, windshield wiper motors, starter motors, commercial aircraft pumps and actuators, magnets, controlled wetting and anti-reflective coatings, optical scattering surfaces, diffractive coatings, and cameras. Integrated magnetic components can be provided, such as micron-thick magnetic thin films from nanoparticles, which are difficult to achieve with top-down fabrication.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A magnetically anisotropic structure comprising a magnetically anisotropic film disposed directly or indirectly on a substrate, wherein said magnetically anisotropic film contains a plurality of discrete magnetic hexaferrite particles, wherein said magnetically anisotropic film is characterized by an average film thickness from about 1 micron to about 5 millimeters, wherein said magnetically anisotropic film contains from 2 wt % to 75 wt % organic binder, and wherein said discrete magnetic hexaferrite particles are not covalently bonded together.

2. The magnetically anisotropic structure of claim 1, wherein said average film thickness is about 10 microns to about 500 microns.

3. The magnetically anisotropic structure of claim 1, wherein said discrete magnetic hexaferrite particles are aligned with a full width at half maximum angular distribution of the hexaferrite particle c-axis direction of about ±20° or less.

4. The magnetically anisotropic structure of claim 1, wherein said discrete magnetic hexaferrite particles have a packing density of at least 40% within said magnetically anisotropic film.

5. The magnetically anisotropic structure of claim 1, wherein said discrete magnetic hexaferrite particles have a maximum dimension from about 500 nanometers to about 5 microns.

6. The magnetically anisotropic structure of claim 1, wherein said discrete magnetic hexaferrite particles are hexagonal platelets with an average diagonal dimension from about 500 nanometers to about 5 microns, and an average thickness from about 5 nanometers to about 100 nanometers.

7. The magnetically anisotropic structure of claim 1, wherein said discrete magnetic hexaferrite particles contain barium hexaferrite ($BaFe_{12}O_{19}$), strontium hexaferrite ($SrFe_{12}O_{19}$), or a combination thereof.

8. The magnetically anisotropic structure of claim 1, wherein said discrete magnetic hexaferrite particles exhibit an average saturation magnetization from about 25 emu/g to about 65 emu/g, measured at 25° C.

9. The magnetically anisotropic structure of claim 1, wherein said discrete magnetic hexaferrite particles exhibit an average magnetic coercivity from about 600 Oe to about 5000 Oe, measured at 25° C.

10. The magnetically anisotropic structure of claim 1, wherein said magnetically anisotropic film is characterized by a saturation magnetization that is greater than 50 emu/g.

11. The magnetically anisotropic structure of claim 1, wherein said magnetically anisotropic film is characterized by a remanence-to-saturation magnetization ratio that is at least 0.7.

12. The magnetically anisotropic structure of claim 1, wherein said substrate is fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof.

13. The magnetically anisotropic structure of claim 1, wherein said substrate is a release film.

14. The magnetically anisotropic structure of claim 13, wherein said release film is a silane-treated and/or siloxane-treated film.

15. The magnetically anisotropic structure of claim 1, wherein said magnetically anisotropic structure is an element of a microelectronics component selected from the group consisting of integrated-circuit chip, a circulator, an isolator, a non-reciprocal component, and a biasing magnet.

16. A magnetically anisotropic structure comprising an out-of-plane magnetically anisotropic film deposited directly or indirectly on a substrate, wherein said magnetically anisotropic film contains a plurality of discrete magnetic hexaferrite particles, wherein said magnetically anisotropic film is characterized by an average film thickness from about 1 micron to about 5 millimeters, wherein said magnetically anisotropic film contains a concentration of said hexaferrite particles of at least 40 vol %, and wherein said discrete magnetic hexaferrite particles are not covalently bonded together.

17. The magnetically anisotropic structure of claim 16, wherein said average film thickness is about 10 microns to about 500 microns.

18. The magnetically anisotropic structure of claim 16, wherein said discrete magnetic hexaferrite particles are aligned with a full width at half maximum angular distribution of the hexaferrite particle c-axis direction of about ±20° or less.

19. The magnetically anisotropic structure of claim 16, wherein said discrete magnetic hexaferrite particles contain barium hexaferrite ($BaFe_{12}O_{19}$), strontium hexaferrite ($SrFe_{12}O_{19}$), or a combination thereof.

20. The magnetically anisotropic structure of claim 16, wherein said discrete magnetic hexaferrite particles exhibit an average saturation magnetization from about 25 emu/g to about 65 emu/g, measured at 25° C.

21. The magnetically anisotropic structure of claim 16, wherein said discrete magnetic hexaferrite particles exhibit an average magnetic coercivity from about 600 Oe to about 5000 Oe, measured at 25° C.

22. The magnetically anisotropic structure of claim 16, wherein said magnetically anisotropic film is characterized by a saturation magnetization that is greater than 50 emu/g.

23. The magnetically anisotropic structure of claim 16, wherein said magnetically anisotropic film is characterized by a remanence-to-saturation magnetization ratio that is at least 0.7.

24. The magnetically anisotropic structure of claim 16, wherein said substrate is fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof.

25. The magnetically anisotropic structure of claim 16, wherein said substrate is a release film that is optionally silane-treated and/or siloxane-treated.

26. The magnetically anisotropic structure of claim 16, wherein said magnetically anisotropic structure is an element of a microelectronics component selected from the group consisting of integrated-circuit chip, a circulator, an isolator, a non-reciprocal component, and a biasing magnet.

27. The magnetically anisotropic structure of claim 1, wherein said magnetically anisotropic structure is produced by a process comprising:
  (a) synthesizing or obtaining magnetic hexaferrite particles;
  (b) thermally treating said magnetic hexaferrite particles at a treatment temperature of at least 800° C.;
  (c) if said magnetic hexaferrite particles are agglomerated, mechanically treating said magnetic hexaferrite particles to form discrete particles;
  (d) combining said magnetic hexaferrite particles with a solvent and an organic binder, to generate a dispersion; and
  (e) in the presence of a magnetic field, depositing said magnetic hexaferrite particles onto a substrate, to generate a magnetically anisotropic film of aligned, discrete magnetic hexaferrite particles disposed on said substrate,
wherein the maximum processing temperature during step (c), step (d), and step (e) is 500° C. or less.

* * * * *